C. O. MASTRUD.
FEED BOX.
APPLICATION FILED MAR. 22, 1910.
978,915.
Patented Dec. 20, 1910.
3 SHEETS—SHEET 1.
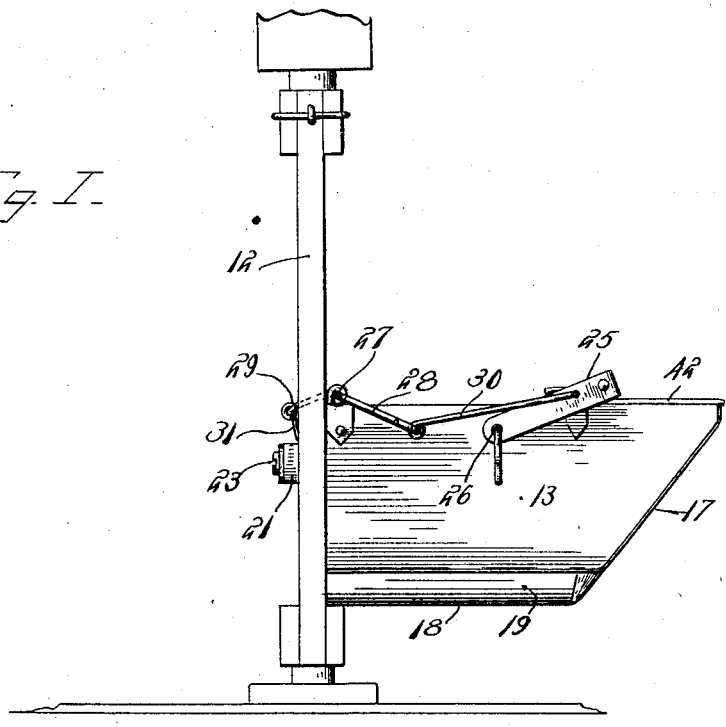
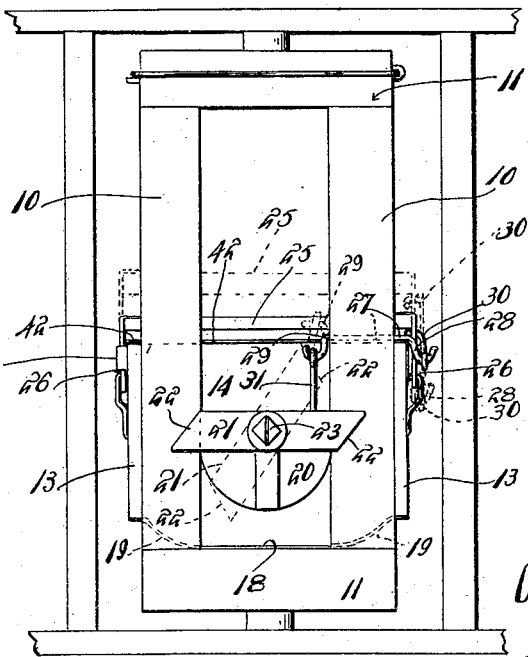
Witnesses
J. C. Simpson
L. N. Gillis
Inventor
Casper O Mastrud.
By Chandler & Chandler
Attorneys C. O. MASTRUD.
FEED BOX.
APPLICATION FILED MAR. 22, 1910.
978,915.
Patented Dec. 20, 1910.
3 SHEETS—SHEET 2.
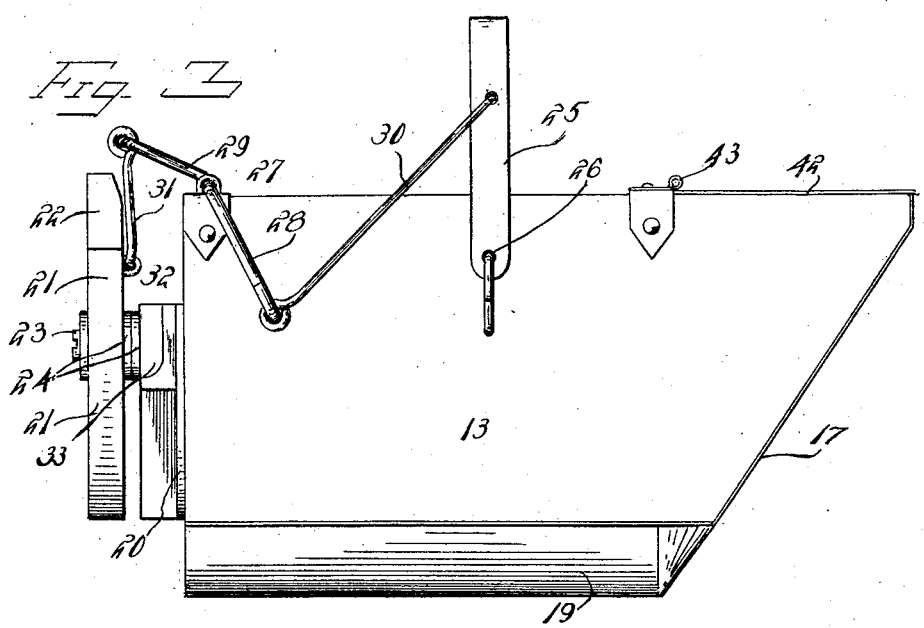
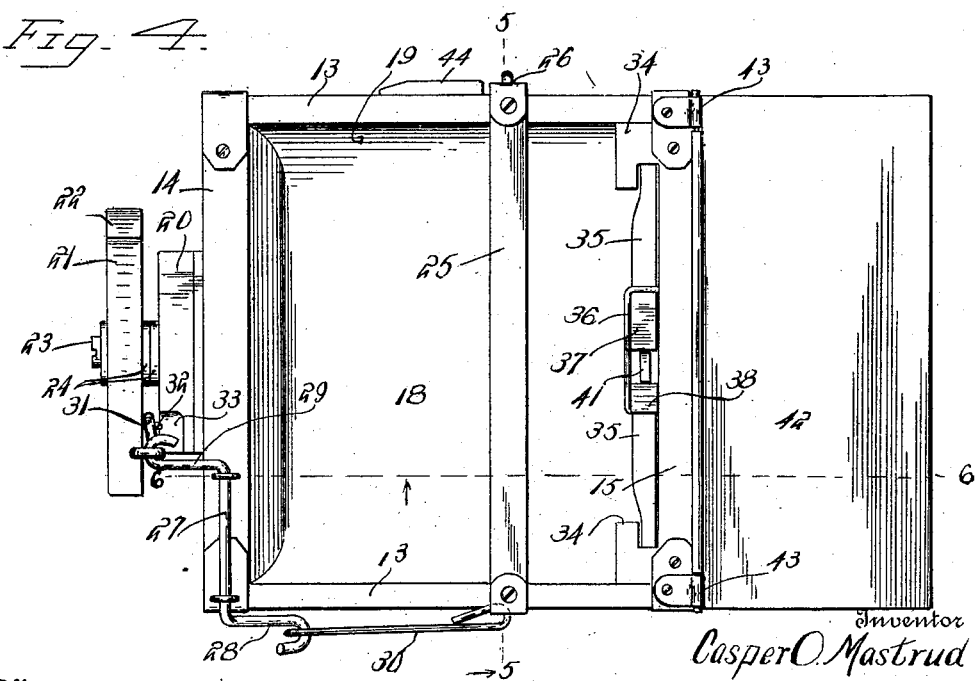

C. O. MASTRUD.
FEED BOX.
APPLICATION FILED MAR. 22, 1910.

978,915.

Patented Dec. 20, 1910.

3 SHEETS—SHEET 3.

Witnesses

Inventor
Casper O. Mastrud
By _____
Attorneys

UNITED STATES PATENT OFFICE.

CASPER O. MASTRUD, OF FOLEY, MINNESOTA.

FEED-BOX.

978,915.  Specification of Letters Patent.  Patented Dec. 20, 1910.

Application filed March 22, 1910.  Serial No. 550,903.

*To all whom it may concern:*

Be it known that I, CASPER O. MASTRUD, a citizen of the United States, residing at Foley, in the county of Benton, State of Minnesota, have invented certain new and useful Improvements in Feed-Boxes; and I do hereby declare the following to be a full, clear, and exact description of the invention, such as will enable others skilled in the art to which it appertains to make and use the same.

This invention relates to feed boxes and has special reference to a feed box adapted for use in connection with the ordinary cattle stanchions.

One object of the invention is to provide a feed box of novel construction which may be readily attached to or detached from the ordinary cattle stanchion.

A second object of the invention is to provide a box of this description in which the attaching means will be so connected with a bail carried on the box that the movement of the bail will place the attaching means in locking or disengaged position.

A third object of the invention is to provide a feed box with a partition arranged to divide the box in storing and feeding portions and provided with a novel form of door actuating and holding mechanism.

With the above and other objects in view, the invention consists in general of a feed box having a carrying bail and being provided with novel means for securing the box to a cattle stanchion, and an operative connection between the carrying bail and securing means; in combination with a partition having a door opening regulated by a door slidable across the opening and supported in a novel manner.

The invention further consists in certain novel details of construction and combinations of parts hereinafter fully described, illustrated in the accompanying drawings, and specifically set forth in the claims.

Figure 5:
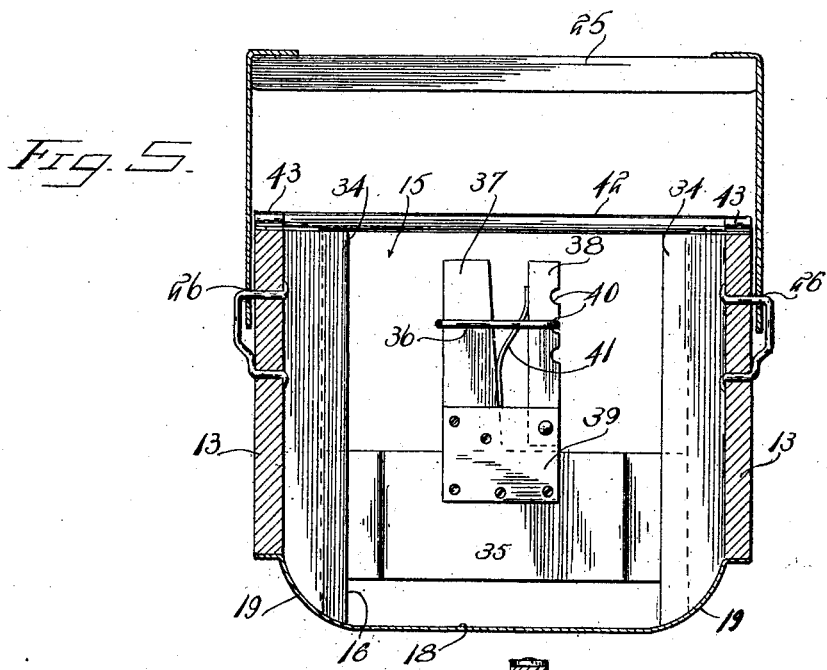
Figure 6:
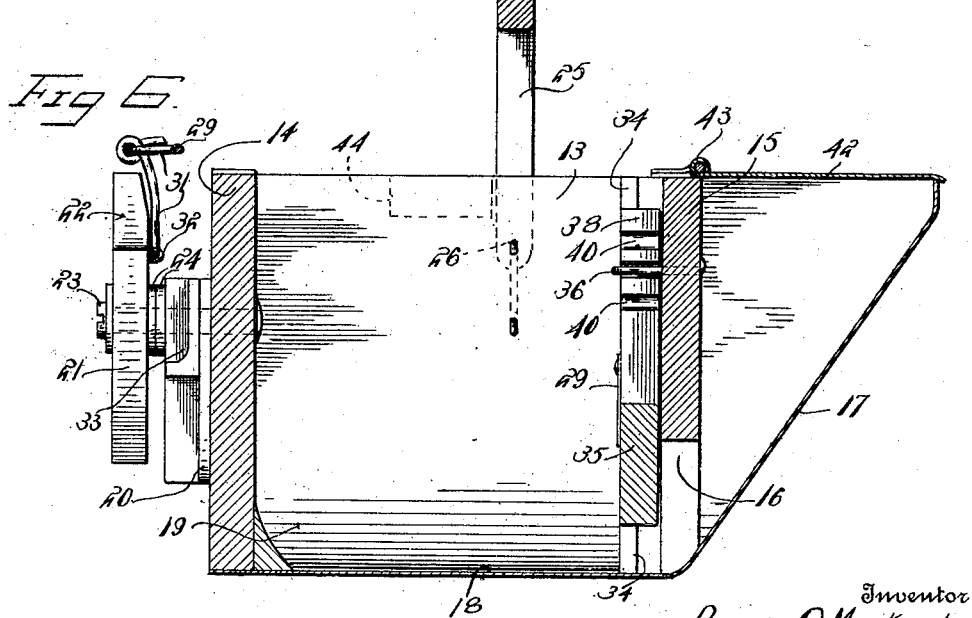

In the accompanying drawings, like characters of reference indicate like parts in the several views, and:—Figure 1 is a side elevation of a cattle stanchion showing the feed box in position thereon. Fig. 2 is a front elevation of such a stanchion and box. Fig. 3 is a side elevation of the feed box removed from the stanchion with the handle raised. Fig. 4 is a top plan view of the box shown in Fig. 3. Fig. 5 is a section on the line 5—5 of Fig. 4. Fig. 6 is a section on the line 6—6 of Fig. 4.

For the purpose of making the operation of the device clear there has here been shown a cattle stanchion which consists of a pair of vertical members 10 connected at the bottom and top by suitable cross members 11. The stanchion thus formed is supported in the usual frame structure 12. It is to be understood that the stanchion here disclosed is merely typical of any desired form of stanchion and that the feed box can be applied to any form without respect to its specific construction.

The box itself consists of a pair of trapezoidal side members 13 which are connected at the front by an end member 14. The front end of the box is preferably perpendicular to the top and bottom so that the trapezoidal side members are formed with their forward corners as right angles. Extending across the box adjacent the rear is a partition 15 which terminates flush with the top of the box and is provided centrally of its lower portion with a door opening 16. The back wall of the box is preferably formed of metal and extends upward at an angle as at 17. The floor of the box is likewise of metal and is flat in the center as indicated at 18 while the connection with the sides is formed by rounded surfaces 19, this preventing the collection of grain in the corners. Carried on the front end of this box is a guide block 20 of such shape and dimensions that the sides of the block fit between the side members 10 of the stanchion when the feed box is applied thereto. This guide block 20 is preferably rounded on the bottom so that if that form of stanchion which is provided with a rounded bottom be employed the guide block can snugly fit therein. Pivoted upon the upper portion of this guide block is a latch member 21 which is provided with oppositely beveled ends 22. This latch member 21 is held to the guide block by means of a horizontal pivot bolt 23 so that the latch member is movable in a vertical plane. In order to properly space the member 21 from the guide block 20 one or more washers 24 are provided between the block and the latch member and it will be obvious that by the employment of a greater or smaller number of washers the distance between the latch member and the end of the box may be varied at will so that different thicknesses of the stanchion members 10 may be allowed for.

By reason of the beveled ends 22 of the member 21 it will be apparent that a movement of about one-eighth of a turn around the pivot bolt 23 will free the latch member 21 from the stanchion members 10, this being apparent from the dotted line position of the member 21 shown in Fig. 2. In order to actuate this latch member 21 by the movement of a bail there is provided on the box a bail 25, the ends of which extend over and are pivoted to the sides of the box as indicated at 26. Upon the forward end of the box is mounted a rock shaft 27 provided with rock arms 28 and 29, the former lying alongside of one side member 13 while the latter projects over the front end of the box. A link 30 connects the rock arm 28 with the bail 25 and a link 31 connects the rock arm 29 with an eye 32 fixed to the member 21. The members 29 and 31 are preferably connected by means of a double eye as clearly seen in the drawings, and the purpose of this connection is to form a species of universal joint so that the link 31 may move in different planes. For the purpose of accommodating the lower end of the link 31 and the eye 32 the guide block 20 is cut-away as indicated at 33 to form a recess wherein said lower end and eye can lie when the member 21 is in locking position as shown in solid lines in Fig. 2.

From an inspection of Figs. 1 and 3 it will be noted that when the bail 25 is depressed the rock arm 28 is pulled upward and rearward by the link 30. This causes the outer end of the rock arm 29 to be depressed and forces the member 21 to the position shown in Fig. 1, wherein it lies across the members 10 so that it holds the feed box securely attached to the members. When the box is picked up by the handle the reverse of the movement just described takes place and the link 30 pushes the rock arm 28 forward and downward with the result that the member 21 is rotated on its pivot so that it assumes the position indicated in dotted lines in Fig. 2 and the feed box may be removed from the stanchion.

It will be seen from the foregoing that the boxes, during transportation, are always ready for attachment to a stanchion and so long as the handle is down the boxes will be safely attached to the stanchion when once placed in position.

In order to provide for regulating the flow of grain from the storage end of the feed box to the feeding end the partition 15 has secured to its sides certain guides 34 and a door 35 is arranged to slide vertically in these guides. Above the door, adjacent the upper edge of the partition is a keeper 36 preferably in the form of a U-shaped loop of wire and through this keeper extends an upright 37 which has its lower end fixedly attached to the door 35. At 38 is a pivoted locking bar, the same being pivoted at its lower end to plates 39 which are in turn connected to the door 35. This locking bar has along one edge a series of notches 40 which are engageable with one of the arms of the keeper 36, the upright 37 bearing against the other arm of said keeper.

In order to hold the notches 40 in engagement with the keeper a spring 41 is provided which lies between the upright 37 and the bar 38 and normally urges the bar into engagement with said keeper.

In order to adjust the opening beneath the door 35 the upright 37 and bar 38 are grasped and the bar moved toward the upright. The door may then be raised or lowered as desired and the bar released so that any one of the notches 40 can be readily engaged with said keeper.

In order to protect the grain in the back of the box from being spilled or from the effects of weather a suitable lid 42 is hinged as at 43 to the top of the partition 15.

For the purpose of limiting the movement of the handle 25 toward the front of the box there is provided a cleat 44 which constitutes a stop and which is secured to the side of said box. This cleat further serves to keep the box balanced when the feed compartment is filled and the box is being carried from place to place.

There has thus been provided a simple and efficient device of the kind described and for the purpose specified.

Having thus described the invention, what is claimed as new, is:—

1. The combination with a feed box; of a movable latch member mounted on the box, a bail on the box, and an operative connection between the bail and latch member.

2. The combination with a feed box; of a latch member pivoted intermediate its ends to one end of the box to swing in a vertical plane, and means to support said member in spaced relation to the box.

3. The combination with a feed box; of a latch member pivoted intermediate its ends to one end of the box to swing in a vertical plane, means to support said member in spaced relation to the box, a bail pivoted to the box, and an operative connection between the bail and latch member.

4. The combination with a feed box; of a guide block fixed to one end of the box and adapted to fit within a cattle stanchion, and a vertically swinging latch member pivoted intermediate its ends to the guide block and adapted to engage the uprights of said stanchion.

5. The combination with a feed box; of a guide block fixed to one end of the box and adapted to fit within a cattle stanchion, a vertically swinging latch member pivoted intermediate its ends to the guide block and adapted to engage the vertical members of said stanchion, a bail pivoted to the box, and an operative connection between said bail and latch member.

6. The combination with a feed box; of a guide block fixed to one end of the box and adapted to fit within a cattle stanchion, a vertically swinging latch member pivoted intermediate its ends to the guide block and adapted to engage the vertical members of said stanchion, a bail pivoted to the box, and an operative connection between said bail and latch member, said connection comprising a rock shaft journaled at the front of said box, an arm extending downward alongside of one side of the box and connected to said rock shaft, a second arm extending out in front of the box and connected to said rock shaft, a link connecting the bail and first mentioned arm, and a second link connecting the latch member and second arm.

7. In a feed box, a partition extending across the box to divide the same in storage and feed spaces, said partition being arranged to provide a delivery opening, guides at the sides of said opening, a door mounted to slide in the guides, a keeper on the upper part of the partition, an upright fixed to said door and extending through the keeper, a swinging lock bar pivotally connected to the door at its lower end and passing through said keeper, said lock bar being provided with notches to engage said keeper, and a spring between the upright and lock bar, said spring constantly urging said lock bar into engagement with the keeper.

In testimony whereof, I affix my signature, in presence of two witnesses.

CASPER O. MASTRUD.

Witnesses:
 GEO. E. HANSIOM,
 KENNETH M. BOLLUM.